March 1, 1932. W. L. MARDEN 1,847,220
CORRECTING DEVICE FOR FLUID FLOW OF METERS
Filed Sept. 6, 1930 2 Sheets-Sheet 2

Inventor
William L. Marden
By his Attorneys
Redding, Greeley, O'Shea & Campbell

Patented Mar. 1, 1932

1,847,220

UNITED STATES PATENT OFFICE

WILLIAM L. MARDEN, OF NEW YORK, N. Y., ASSIGNOR TO NEPTUNE METER COMPANY, OF NEW YORK, N. Y., A CORPORATION OF NEW JERSEY

CORRECTING DEVICE FOR FLUID FLOW OF METERS

Application filed September 6, 1930. Serial No. 480,264.

The present invention relates to meters and embodies, more specifically, an improved meter wherein the errors ordinarily existing therein are effectively overcome.

More particularly, the invention relates to a flow correcting means for fluid meters, such means functioning equally effectively at all rates of flow of the fluid meter. It is commonly known that the ability to correct errors in meters by changing the gear ratios thereof has decided limitations and to serve as a further fugitive adjustment to correct errors in meter readings, a needle valve has been provided to by-pass a small portion of the fluid around the meter. Where there is a substantially uniform rate of flow, this valve is quite effective as a correcting agent but where the rate of flow varies widely, the valve is not dependable inasmuch as a greater relative quantity of fluid is by-passed under low rates of flow than with high rates.

An object of the present invention is to provide a flow correcting device for meters which is accurate and effective under all rates of flow.

A further object of the invention is to provide, in combination with a correcting device which is accurate under small rates of flow, a correcting device which is accurate under high rates of flow.

A further object of the invention is to provide a correcting means of the above character wherein provision is made for correcting the meter reading accurately under all rates of flow.

The above objects are attained in the device described herein by providing, in combination with a variable needle valve a reed valve which is opened by the pressure of the fluid, thus passing a definite quantity of the fluid in proportion to the quantity passing through the metering device under high rates of flow.

Further objects, not specifically enumerated above, will be apparent as the invention is described in greater detail in connection with the accompanying drawings, wherein.

Referring to the above drawings, a meter housing is shown at $a$ having an inlet $a'$ and a wobble disc $a^2$ of the usual form. This disc drives a registering mechanism carried within a housing $a^3$ and back of the meter dial $a^4$, the specific form of registering mechanism forming no part of the present invention. As is usual with meters of this type, the fluid passes into the chamber $a^5$ and through the disc chamber, as indicated by the arrows in Figure 2. After moving the disc around, the fluid escapes through outlet chamber $a^6$ and outlet $a^7$.

Figure 1:
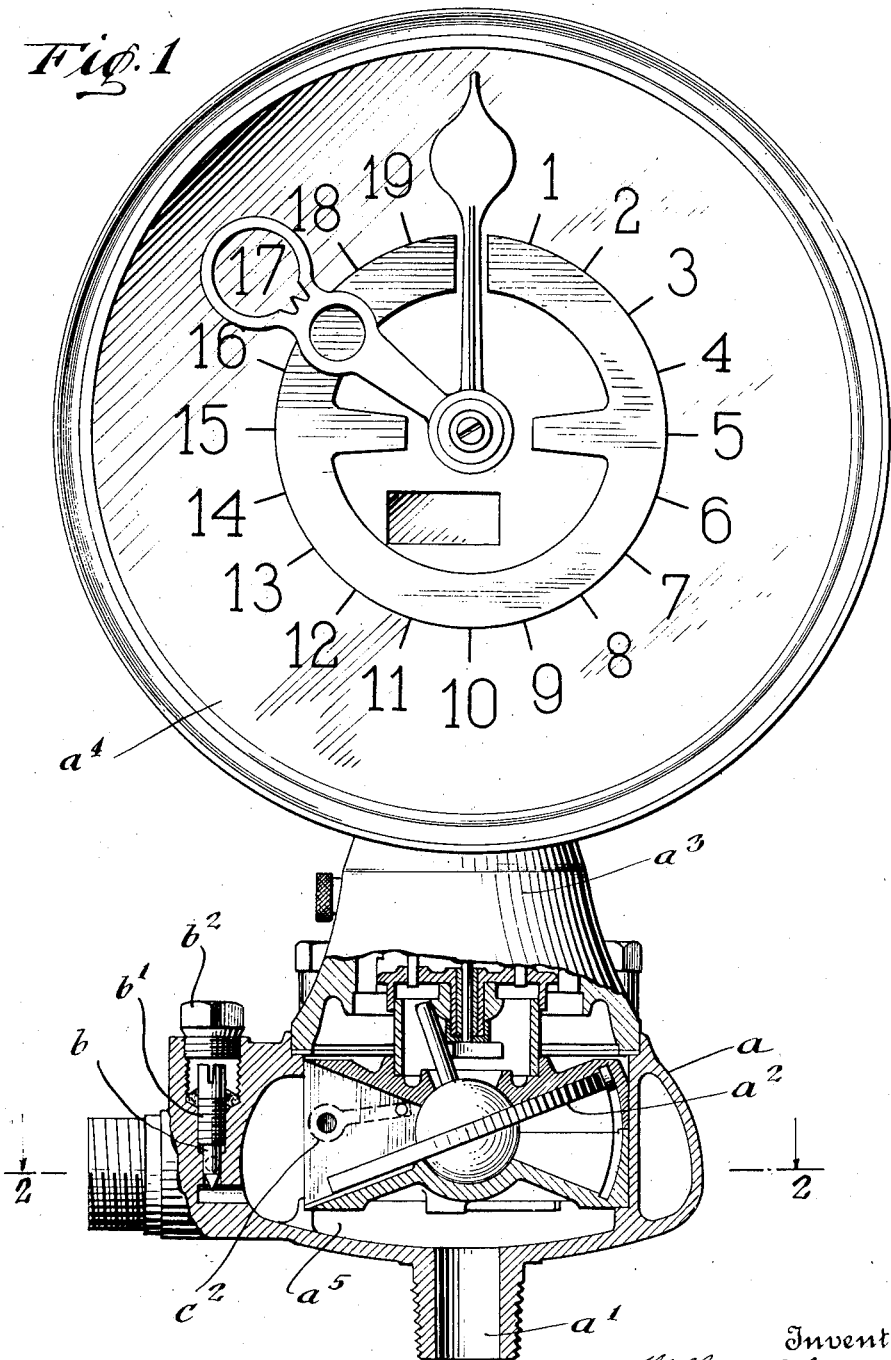
Figure 1 is a view in front elevation, partly broken away and in section, showing a meter constructed in accordance with the present invention.
Figure 2:
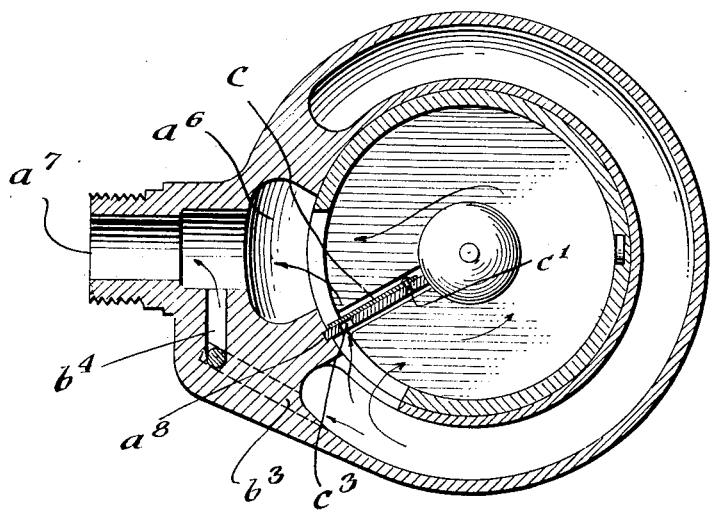
Figure 2 is a view in section, taken on line 2—2 of Figure 1, and looking in the direction of the arrows.
Figure 3:
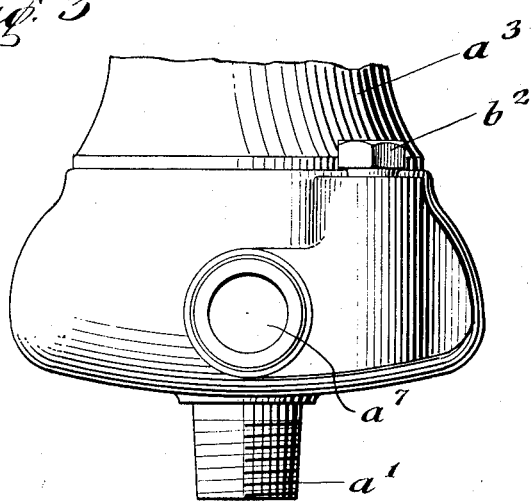
Figure 3 is a view in side elevation, showing a portion of the meter of Figure 1.

To restrict the flow of the fluid and force the same to pass through the disc chamber, a partition $a^8$ is provided, this partition being mounted as shown in Figure 2. As previously stated, the error in meter reading may be corrected by means of a needle valve $b$. This needle valve is formed of a threaded stem $b'$ which may be adjusted in a simple fashion and which is protected by means of a nut $b^2$. A passage $b^3$ is formed in the housing $a$ for diverting a small portion of the fluid from the meter and directing its flow to the needle valve. From the needle valve a second passage $b^4$ is provided to direct the fluid from the needle valve to the outlet $a^7$. As stated above, this needle valve by-passes proportionately more fluid under low rates of flow than under high rates and therefore is not sufficiently accurate for wide ranges of flow.

To correct the meter reading under high rates of flow, a reed valve is provided and includes a leaf spring $c$ which is preferably riveted to the partition $a^8$ at $c'$. The leaf spring is formed with an enlarged closure $c^2$ which is adapted to overlie a metering opening $c^3$, formed in the partition $a^8$. It will thus be seen that pressure of the fluid entering the meter will serve to lift the closure $c^2$ from the aperture and permit a quantity thereof to be by-passed around the meter. Under high rates of flow, the pressure is greater and unseats the closure a greater amount than under low rates, the quantity of fluid by-passed thus varying in proportion to the pressure of the fluid. The accuracy of this by-pass is not great under low rates of flow inasmuch as low pressures will not unseat the closure in proportion to the rate of flow.

It will thus be seen that the reed valve functions effectively as a correcting agent under high rates of flow, under which condition the needle valve is ineffective as a correcting agent when previously adjusted for correcting under low rates of flow. On the other hand when the reed valve is designed to correct under high rates of flow, the accuracy thereof in correcting under low rates of flow is negligible and at this time the needle valve functions effectively. By balancing the correcting values of the two valves, the reading of the meter may be effectively corrected for all rates of flow.

While the invention has been described with specific reference to the accompanying drawings, it is not to be limited, save as defined in the appended claim.

I claim as my invention:

In combination with a meter having inlet and outlet chambers, an impeller in the path of flow between said chambers and a partition between the chambers, there being a passage adapted to bypass fluid from said inlet chamber to said outlet chamber, a needle valve to regulate the flow of fluid through said bypass, said partition having an orifice between the chambers, a closure for the orifice, and a leaf spring secured to the partition and mounting the closure thereon to maintain the same against the orifice.

This specification signed this 28th day of August A. D. 1930.

WILLIAM L. MARDEN.